United States Patent
Iida et al.

(10) Patent No.: US 8,196,790 B2
(45) Date of Patent: Jun. 12, 2012

(54) METHOD OF MANUFACTURING SUCTION CUP, SUCTION CUP, AND ON-VEHICLE APPARATUS

(75) Inventors: Minoru Iida, Saitama (JP); Makoto Kawabata, Tokyo (JP); Fumio Hara, Saitama (JP)

(73) Assignee: Sony Corporation, Tokyo (JP)

( * ) Notice: Subject to any disclaimer, the term of this patent is extended or adjusted under 35 U.S.C. 154(b) by 95 days.

(21) Appl. No.: 12/608,784

(22) Filed: Oct. 29, 2009

(65) Prior Publication Data

US 2010/0044539 A1 Feb. 25, 2010

Related U.S. Application Data

(62) Division of application No. 11/452,214, filed on Jun. 14, 2006, now Pat. No. 7,850,891.

(30) Foreign Application Priority Data

Jun. 20, 2005 (JP) ................. 2005-179780

(51) Int. Cl.
*B60R 11/00* (2006.01)
*F16B 47/00* (2006.01)
*B60R 7/06* (2006.01)

(52) U.S. Cl. ............... 224/483; 224/482; 248/205.5; 248/206.2; 248/467

(58) Field of Classification Search ............ 248/205.5, 248/205.6, 205.7, 205.8, 205.9, 206.2, 206.3, 248/206.4, 467; 224/482, 483

See application file for complete search history.

(56) References Cited

U.S. PATENT DOCUMENTS

| 5,964,437 A | 10/1999 | Belokin et al. |
| 6,123,889 A * | 9/2000 | Katagiri et al. ............... 264/255 |
| 6,143,391 A | 11/2000 | Barnes et al. |
| 6,155,469 A * | 12/2000 | Johnson et al. ............... 224/482 |
| 6,634,532 B1 * | 10/2003 | Maguire ....................... 224/483 |
| 6,663,064 B1 | 12/2003 | Minelli et al. |
| 6,749,160 B1 | 6/2004 | Richter |

(Continued)

FOREIGN PATENT DOCUMENTS

JP 56-44214 4/1981

(Continued)

OTHER PUBLICATIONS

Office Action issued Oct. 28, 2010, in Japanese Patent Application No. 2005-179780 (with English translation).

*Primary Examiner* — Gary Elkins
(74) *Attorney, Agent, or Firm* — Oblon, Spivak, McClelland, Maier & Neustadt, L.L.P.

(57) ABSTRACT

A suction cup includes a suction cup main body, an attachment surface and a gel layer. The surface of the gel layer serves as a suction surface. In a method of manufacturing a suction cup, a cavity is formed in the inside of a common mold and a primary mold. Next, a synthetic resin material is injected into the cavity, to mold the suction cup main body. Subsequently, the primary mold is opened, to obtain the suction cup main body. Next, a secondary mold is mated to the common mold, whereby a cavity is formed in the inside of the common mold and the secondary mold. Subsequently, a gel is injected into the cavity, to mold the gel layer. Next, the secondary mold is opened, to obtain a suction cup composed of the gel layer and the suction cup main body, on the common mold.

8 Claims, 5 Drawing Sheets

U.S. PATENT DOCUMENTS

| | | | |
|---|---|---|---|
| 7,850,891 B2 * | 12/2010 | Ilda et al. | 264/255 |
| 2002/0125154 A1 * | 9/2002 | Abeyta et al. | 206/308.1 |

FOREIGN PATENT DOCUMENTS

| | | | |
|---|---|---|---|
| JP | 57-160421 | | 10/1982 |
| JP | 62-41417 | | 2/1987 |
| JP | 4-216024 A | * | 8/1992 |
| JP | 5-48746 | | 6/1993 |
| JP | 6-54911 | | 7/1994 |
| JP | 7-308389 | | 11/1995 |
| JP | 8-66990 | | 3/1996 |
| JP | 8-99332 | | 4/1996 |
| JP | 8-326736 | | 12/1996 |
| JP | 11-230149 | | 8/1999 |
| JP | 11-257334 | | 9/1999 |
| JP | 2000-179530 | | 6/2000 |
| JP | 3098169 | | 8/2000 |
| JP | 2001-97312 | | 4/2001 |
| JP | 2002-355853 A | * | 12/2002 |
| JP | 2004-293570 | | 10/2004 |
| WO | WO 2005/035999 A1 | | 4/2005 |

* cited by examiner

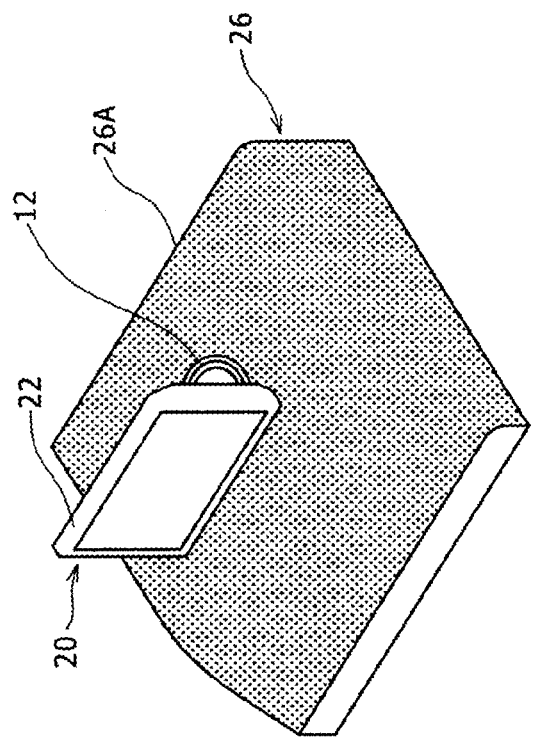
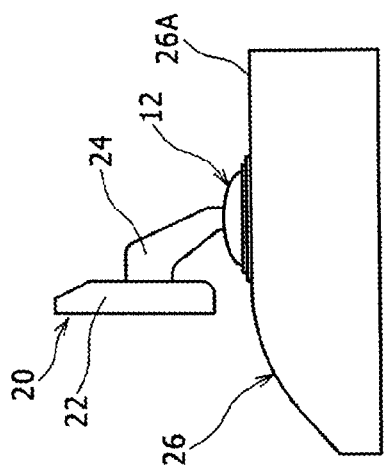
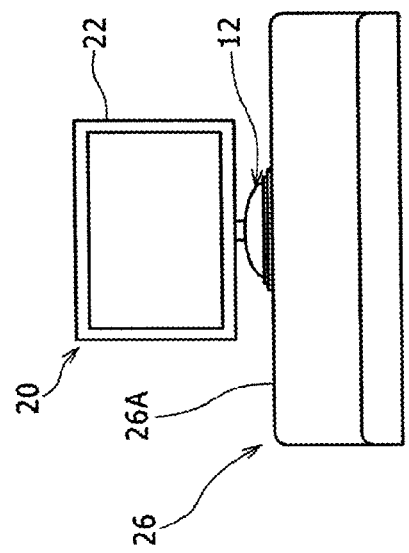

METHOD OF MANUFACTURING SUCTION CUP, SUCTION CUP, AND ON-VEHICLE APPARATUS

CROSS-REFERENCE TO RELATED APPLICATIONS

The present application is a divisional of, and claims the benefit of priority under 35 U.S.C. §120 from, U.S. Ser. No. 11/452,214, filed Jun. 14, 2006, and is based upon, and claims the benefit of priority under 35 U.S.C. §119 from, Japanese Patent Application No. 2005-179780 filed Jun. 20, 2005, the entire contents of each of which are incorporated herein by reference.

BACKGROUND OF THE INVENTION

1. Technical Field

The present invention relates to a method of manufacturing a suction cup, a suction cup obtained by the manufacturing method, and an on-vehicle apparatus having the suction cup.

2. Description of the Related Art

In the case of attaching an on-vehicle apparatus, such as a display of a car navigation system, a television set, etc., to a dashboard, a pressure sensitive adhesive double coated tape has hitherto been used.

However, the use of the pressure sensitive adhesive double coated tape has the problem that upon detachment of the on-vehicle apparatus, a trace of the pressure sensitive adhesive tape is left on the dashboard, thereby staining the dashboard.

In view of this problem, it may be contemplated to attach an on-vehicle apparatus to a dashboard by use of a suction cup.

However, although the on-vehicle apparatus can be attached by use of a suction cup in the case where the dashboard is composed of a smooth flat surface, it may be impossible, in the case where the surface of the dashboard is formed as a rough skin to be a minutely rugged surface or a rough surface, for the suction cup to adhere to the rough skin by suction.

In order to enable suction of a suction cup onto such a rugged surface or rough surface, the use of an auxiliary sheet for securing a smooth surface has been proposed (refer, for example, to Japanese Patent Laid-open No. Hei 11-257334). However, since the auxiliary sheet is also adhered to the dashboard by use of a pressure sensitive adhesive double coated tape, removal of the auxiliary sheet together with the on-vehicle apparatus leaves a trace of the pressure sensitive adhesive tape, thereby staining the dashboard.

In view of this, there has been proposed a suction cup in which a gel sheet-made packing is attached to a suction cup body and the surface of the gel sheet-made packing serves as a suction surface (refer, for example, to Japanese Patent Laid-Open No. Hei 11-230149).

In this suction cup, the gel sheet-made packing is attached to the suction cup body by use of a pressure sensitive double coated tape or an adhesive, or a central portion of the gel sheet-made packing is attached to the suction cup body by use of a fixture.

SUMMARY OF THE INVENTION

On the other hand, the temperature inside a vehicle may rise to 70 to 80° C. in summer. Therefore, where the gel sheet-made packing is attached to the suction cup body by a pressure sensitive adhesive double coated tape or an adhesive, the gel sheet-made packing is liable to be peeled from the suction cup body, probably making it impossible to stably hold the on-vehicle apparatus on the dashboard.

Where a central portion of the gel sheet-made packing is attached to the suction cup body by use of a fixture, the peripheral portion of the gel sheet-made packing and the suction cup body are not attached to each other in a stable state. Therefore, due to the vibration of the vehicle during running or the like cause, the on-vehicle apparatus is shaken, making it impossible to stably hold the on-vehicle apparatus on the dashboard.

Particularly, the place where an on-vehicle apparatus is installed is the surface of the dashboard, and in many cases the surface is not a horizontal surface but an inclined surface and is formed as a curved surface. Therefore, where the on-vehicle apparatus is a heavy apparatus such as a display, a component of the weight of the apparatus would, upon vibration of the vehicle during running, act on the suction cup as a moment. Accordingly, the structure wherein the gel sheet-made packing is attached to the suction cup body by a pressure sensitive adhesive double coated tape or an adhesive and the structure wherein only the central portion of the gel sheet-made packing is attached to the suction cup body by use of a fixture are disadvantageous to stable holding of the on-vehicle apparatus on the dashboard.

Thus, there is a need for a method of manufacturing a suction cup by which it is ensured that the suction cup achieves suction holding even onto a rugged surface, a gel layer and a suction cup main body are kept integrated without peeling, and a heavy on-vehicle apparatus can be stably held on a dashboard. Also, there is a need for a suction cup obtained by such a manufacturing method. Further, there is a need for an on-vehicle apparatus provided with such a suction cup.

According to an embodiment of the present invention, there is provided a method of manufacturing a suction cup including: a suction cup main body formed from an elastic synthetic resin material; an attachment surface formed on the suction cup main body; and a gel layer provided integrally with the attachment surface and formed of a gel, the surface of the gel layer serving as a suction surface. The method includes: mating a primary mold with a common mold to form a suction main body molding cavity in the inside of the molds so that the attachment surface molded in a shape corresponding to the suction cup main body fronts on the primary mold; injecting the synthetic resin material in a fluid state into the suction cup main body molding cavity to mold the suction cup main body, opening the primary mold to obtain the suction cup main body on the common mold, with the attachment surface directed in the direction of separating the primary mold; then mating a secondary mold with the common mold to form a gel layer molding cavity having a shape corresponding to the gel layer in the inside of the molds and between the mold and the attachment surface; injecting the gel in a fluid state into the gel layer molding cavity to mold the gel layer on the attachment surface, and opening the secondary mold to obtain the suction cup.

According to another embodiment of the present invention, there is provided a suction cup including a suction cup main body formed from an elastic synthetic resin material, and a gel layer formed of a gel. In the suction cup, the suction cup main body and the gel layer are integrally provided by two-color molding; the suction cup main body has an attachment surface; the gel layer is provided at the attachment surface; and the surface of the gel layer serves as a suction surface.

According to a further embodiment of the present invention, there is provided an on-vehicle apparatus to be mounted in a vehicle. The on-vehicle apparatus includes a suction cup for mounting the on-vehicle apparatus in the vehicle; the suction cup has a suction cup main body formed from an elastic synthetic resin material, and a gel layer formed of a gel; the suction cup main body and the gel layer are integrally provided by two-color molding; the suction cup main body has an attachment surface; the gel layer is provided at the attachment surface; and the surface of the gel layer serves as a suction surface.

The suction cup obtained by the two-color molding according to the manufacturing method in the present invention has the gel layer integrally attached to the attachment surface of the suction cup main body, and the gel layer would not be peeled from the attachment surface.

According to the suction cup in the present invention, since the gel layer would not be peeled from the attachment surface, a heavy on-vehicle apparatus can be stably held on a dashboard.

According to the on-vehicle apparatus in the present invention, the suction cup is composed of the suction cup main body and the gel layer, and, since the gel layer would not be peeled from the suction cup main body, the on-vehicle apparatus can be stably installed on a dashboard.

BRIEF DESCRIPTION OF THE DRAWINGS

FIG. 1A is a perspective view of the condition where a display of a car navigation system is attached to a dashboard by a suction cup according to an embodiment of the present invention, FIG. 1B is a front view of the same, and FIG. 1C is a side view of the same;

DETAILED DESCRIPTION OF THE PREFERRED EMBODIMENTS

Figure 2A:
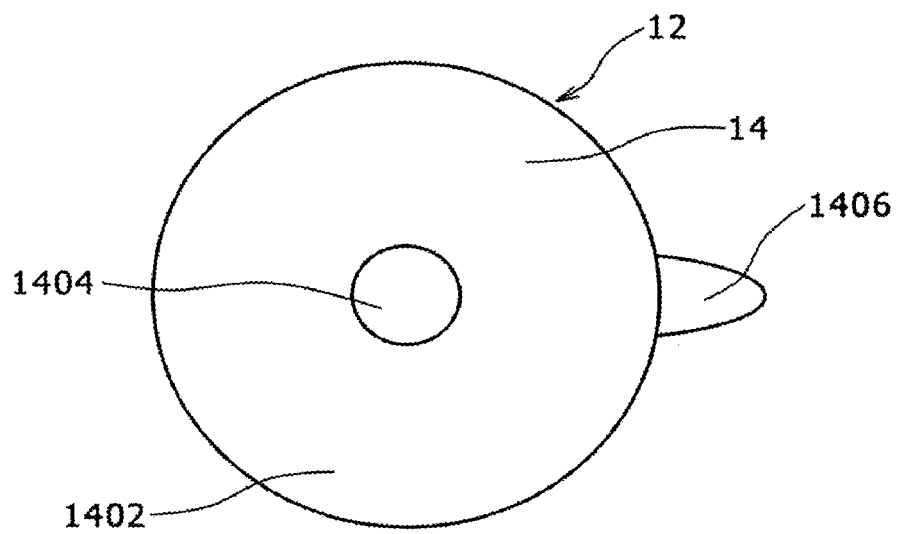
FIG. 2A is a plan view of the suction cup.

Now, embodiments of the present invention will be described below referring to the drawings.

Description will be made of the case where a display of a car navigation system which is an on-vehicle apparatus is attached to a dashboard by a suction cup according to an embodiment of the present invention.

FIG. 1A is a perspective view of the condition where a display of a car navigation system is attached to a dashboard by a suction cup according to an embodiment of the present invention, FIG. 1B is a front view of the same, and FIG. 1C is a side view of the same.

A holder 24 is projectingly provided on the back surface of a frame 22 of the display 20 in the car navigation system, a suction cup 12 is provided at a lower portion of the holder 24, and the display 20 is attached onto the upper surface 26A of the dashboard 26 by the suction cup 12.

The upper surface 26A of the dashboard 26 is not a horizontal surface but is inclined toward the compartment side, and is constituted of a gently curved surface; in addition, the surface is formed as a rough skin, which is a minutely rugged surface or a rough surface.

Figure 2B:
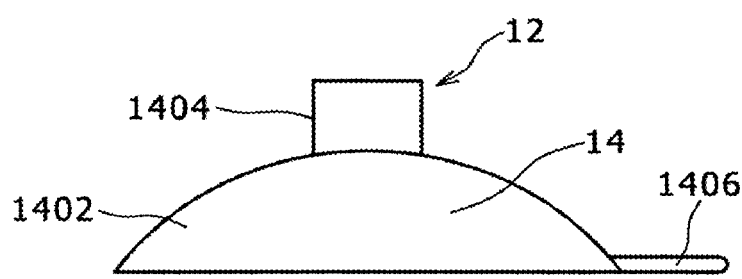
FIG. 2B is a front view of the same.
Figure 2C:
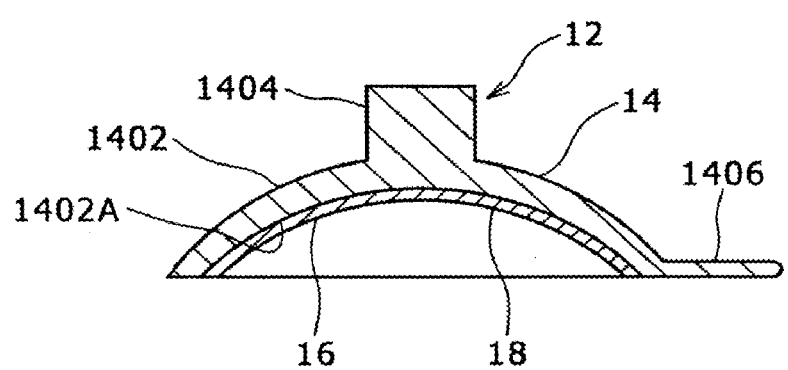
FIG. 2C is a sectional front view of the same.

FIG. 2A is a plan view of the suction cup, FIG. 2B is a front view of the same, and FIG. 2C is a sectional front view of the same.

The suction cup 12 includes a suction cup main body 14, and a gel layer 16 provided integrally with the suction cup main body 14, and the surface of the gel layer 16 is formed as a suction surface 18.

The suction cup main body 14 is formed from an elastic synthetic resin material, which may be any of conventionally known various materials used in the past for forming suction cups, for example, synthetic resin materials based on urethane, styrene, silicone resin, or the like.

The suction cup main body 14 includes a curved surface portion 1402, a columnar portion 1404 projected from the center of the curved surface portion 1402, and a piece body 1406 projected from the periphery of the curved surface portion 1402.

The surface, located opposite to the columnar portion 1404, of the curved surface portion 1402 is formed as a concave attachment surface 1402A.

The suction cup 12 is connected to the holder 24 by a method wherein the columnar portion 1404 is fitted in a hole formed in a lower portion of the holder 24 and is fixed in situ by a screw, an adhesive or the like.

The gel layer 16 is integrally attached to the attachment surface 1402A in a uniform thickness over the whole area of the attachment surface 1402A, and the gel layer 16 is integrated with the attachment surface 1402A. For example, where the outside diameter of the gel layer 16 (or the outside diameter of the curved surface portion 1402) is 70 to 80 mm, the thickness of the gel layer 16 is around 1 mm.

The surface of the gel layer 16 is formed as the suction surface 18, and the suction surface 18 is concave in shape.

The gel constituting the gel layer 16 is preferably a gel which is resistant to spontaneous decomposition, is resistant to deterioration and is weatherproof, in consideration of the mode in which the suction cup (display) is to be used.

Besides, in consideration of mass producibility by use of a mold, the gel constituting the gel layer 16 is preferably a gel which is thermoplastic or thermosetting. Incidentally, since the temperature in a vehicle may rise to 70 to 80° C., the melting point of the gel is preferably much higher than the just-mentioned temperature, for example, not less than 150° C.

Examples of the thermoplastic gel include gels based on polyethylene, styrene or the like, and examples of the thermosetting gel include gels based on silicone resin or the like; in both cases, the gel is selected from synthetic resin-based gels.

As the polyethylene-based gel, for example, the commercial product available from Kosumo Instruments Co., Ltd. under the tradename of "COSMOGEL" can be used.

As the styrene-based gel, for example, the commercial product available from Inoac Corporation under the tradename of "NAGFLEX" can be used.

As the silicone-based gel, for example, the commercial product available from Geltec Co., Ltd. under the tradename of "αGEL" can be used.

The suction cup 12 such that the gel layer 16 is integrated with the attachment surface 1402A and the gel layer 16 would not be peeled from the attachment surface 1402A can be manufactured easily and assuredly by two-color molding as described below.

FIGS. 3A to 3C and FIGS. 4A to 4C are illustrations of manufacturing steps for the suction cup 12.

Figure 3A:
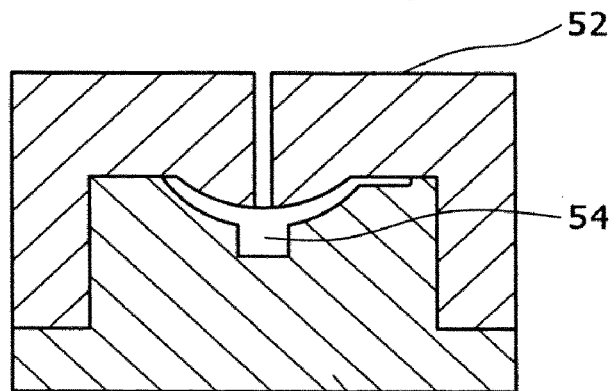
FIGS. 3A to 3F are illustrations of manufacturing steps for the suction cup.

First, as shown in FIG. 3A, a primary mold 52 is mated to a common mold 50, to form a suction main body molding cavity 54 in the inside of the molds 50, 52 so that the attachment surface 1402A molded in a shape corresponding to a suction cup main body 14 fronts on the primary mold 52.

Figure 3B:
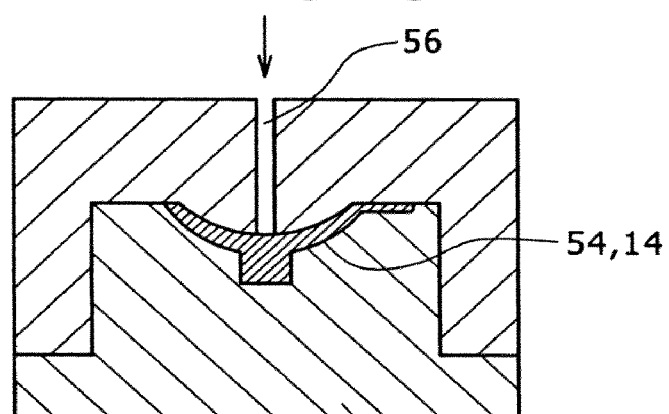

Next, as shown in FIG. 3B, a synthetic resin material in a fluid state is injected through an injection passage 56 into the suction cup main body molding cavity 54, to mold the suction cup main body 14.

In this instance, where the synthetic resin material is a thermoplastic material such as a urethane-based material and a styrene-based material, the injection molding of the suction cup main body 14 is conducted by injecting the synthetic resin material in a molten state into the suction cup main body molding cavity 54, followed by cooling.

On the other hand, where the synthetic resin is a thermosetting material such as a silicone-based material, the injection molding of the suction cup main body 14 is conducted by injecting the synthetic resin material in a fluid state into the suction cup main body molding cavity 54, followed by heating and then cooling.

Figure 3C:
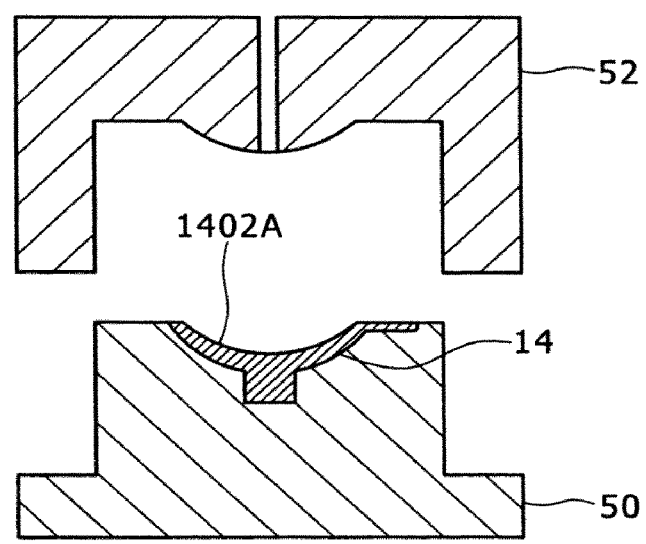

Subsequently, as shown in FIG. 3C, the primary mold 52 is opened, to obtain the suction cup main body 14 on the common mold 50, with the attachment surface 1402A directed in the direction of separating the primary mold 52.

Figure 3D:
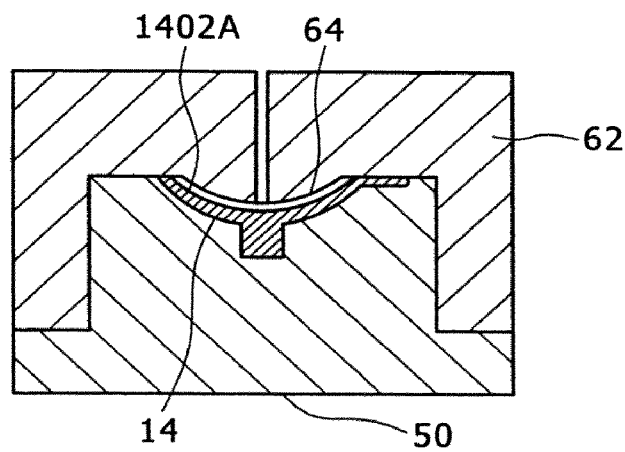

Next, as shown in FIG. 3D, a secondary mold 62 is mated to the common mold 50, to form a gel layer molding cavity 64 in a shape corresponding to the gel layer 16, in the inside of the molds 50, 62 and between the mold and the attachment surface 1402A.

Figure 3E:
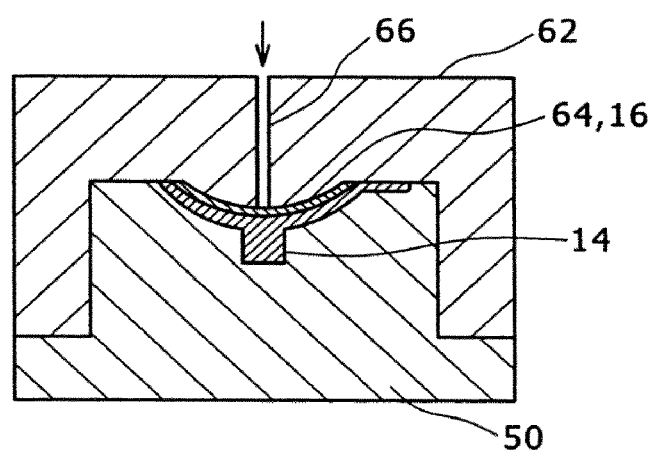

Subsequently, as shown in FIG. 3E, a gel in a fluid state is injected through an injection passage 66 into the gel layer molding cavity 64, to mold the gel layer 16 on the attachment surface 1402A.

In this instance, where the gel is a thermoplastic gel such as a polyethylene-based gel and a styrene-based gel, the injection molding of the gel layer 16 is conducted by injecting the gel in a molten state into the gel layer molding cavity 64, followed by cooling.

On the other hand, where the gel is a thermosetting gel such as a silicone resin-based gel, the injection molding of the gel layer 16 is conducted by injecting the gel in a fluid state into the gel layer molding cavity 64, followed by heating and then cooling.

Figure 3F:
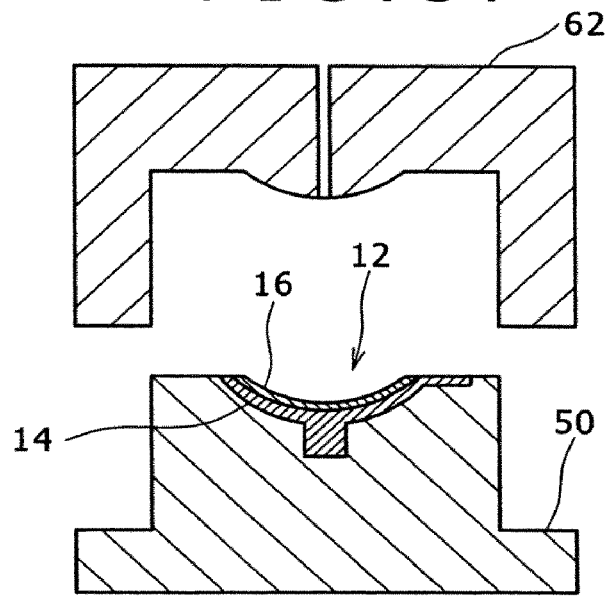
Figure 4A:
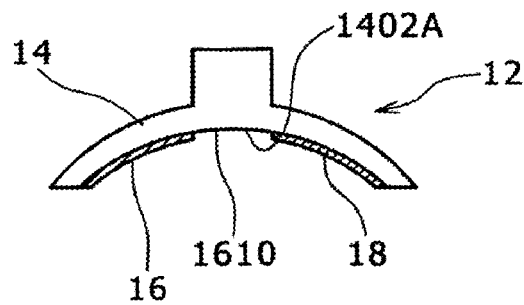
FIG. 4A is a sectional front view of a modified embodiment of the suction cup.
Figure 4B:
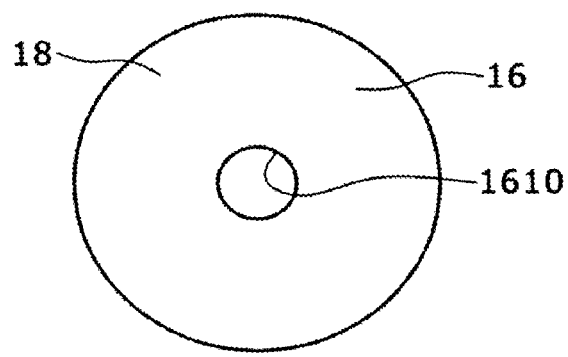
FIG. 4B is a bottom view of the same.

Next, as shown in FIG. 3F, the secondary mold 62 is opened, to obtain on the common mold 50 a suction cup 12 composed of the gel layer 16 and the suction cup main body 14.

The suction cup 12 obtained by the two-color molding in this manner has a configuration in which the gel layer 16 is integrally attached to the attachment surface 1402A of the suction cup main body 14; in other words, the gel layer 16 is integrated with the attachment surface 1402A, so that the gel layer 16 would not be peeled from the attachment surface 1402A.

Therefore, according to the suction cup 12 in this embodiment, the suction surface 18 is composed of the surface of the gel layer 16, so that even when the upper surface 26A of the dashboard 26 is formed as a rough skin which is a rugged surface or a rough surface, the suction surface 18 will deform following up to the ruggedness. Accordingly, the suction surface 18 can make close contact with (or good adhesion to) the rugged surface or rough surface, without any air between the rugged surface and the suction surface 18.

Therefore, the suction cup 12 can be attached onto a rugged surface or a rough surface by suction for certain by bearing down the attachment surface 1402A onto the upper surface 26A of the dashboard 26, then releasing the operator's grasp so as to attach the display 20 onto the upper surface 26A of the dashboard 26 without fail.

In addition, in removing the display 20, it suffices to grip the piece body 1406 and peel the suction surface 18 from the upper surface 26A of the dashboard 26. Thus, the removal of the display 20 can also be carried out easily.

Therefore, even where the upper surface 26A of the dashboard 26 is a rugged surface or a rough surface, the display 20 can be attached by use of the suction cup 12. Besides, removal of the display 20 would not produce the problem that a trace of the pressure sensitive adhesive tape might be left on the upper surface 26A of the dashboard 26, thereby staining the upper surface 26A of the dashboard 26.

Furthermore, the suction cup 12 obtained by the two-color molding has the structure in which the gel layer 16 is integrally attached to the attachment surface 1402A. Therefore, even when the temperature inside a vehicle rises in summer or when the suction cup 12 receives vibrations of the vehicle during running, there is no possibility that the gel layer 16 might be peeled from the attachment surface 1402A of the suction cup main body 14.

To be more specific, a heavy display 20 can be stably held on a dashboard 26 even in the case where the upper surface 26A of the dashboard 26 is a curved surface inclined toward the compartment side and is minutely rugged or rough and a component force of the weight of the display 20, upon vibration of the vehicle during running, is exerted on the suction cup as a moment.

In addition, as a general property of a gel, the same gel state as that at normal temperature is maintained even when temperature is lowered (for example, to −50° C.). Therefore, where an on-vehicle apparatus is installed in a vehicle with cold-place specifications, the suction force of the suction cup 12 can be secured, which is advantageous to stable bolding of the on-vehicle apparatus.

Besides, since the suction cup main body 14 and the gel layer 16 are integrated with each other, the suction cup 12 is easier to handle than a conventional suction cup wherein a gel sheet-made packing and a suction cup body are separate members. This is advantageous to alleviation of burden on the user at the time of attaching an on-vehicle apparatus.

In addition, where an on-vehicle apparatus such as a display 20 is mounted in a vehicle by use of the suction cup 12, correction of the attaching position can be easily carried out, so that the on-vehicle apparatus can be easily attached, without care about a deviation from the desired position. Besides, this enables any user to easily attach the on-vehicle apparatus at a predetermined normal position or a desired position; thus, the suction cup 12 is excellent in convenience in use.

Now, a modified embodiment of the suction cup 12 will be described.

In the above embodiment, description has been made of the case where the gel layer 16 is formed over the whole area of the attachment surface 1402A of the suction cup main body 14. However, as illustrated by a sectional front view in FIG. 4A and a bottom view in FIG. 4B, a gel-lacking portion 1610 may be provided at a position, corresponding to the center of the attachment surface 1402A, of the gel layer 16. Even where such a gel-lacking portion 1610 is provided, the suction surface 18 can be attached to a rugged or rough surface by suction.

Figure 5A:
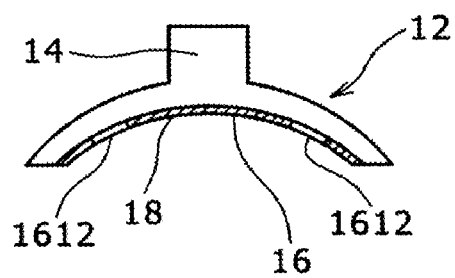
FIG. 5A is a sectional front view of another modified embodiment of the suction cup.
Figure 5B:
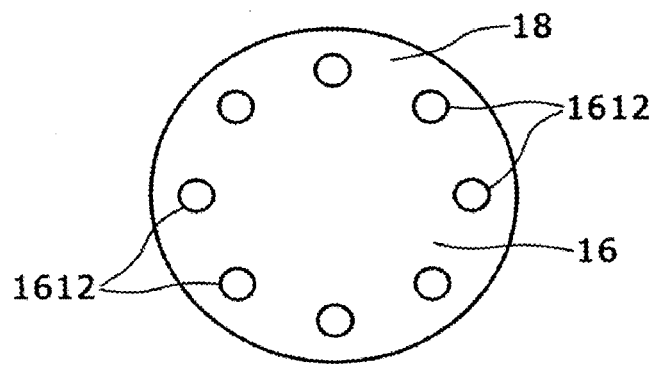
FIG. 5B is a bottom view of the same.

Besides, as illustrated by a sectional front view in FIG. 5A and a bottom view in FIG. 5B, the gel layer 16 may be provided with a plurality of gel-lacking portions 1612 at intervals. Even where such gel-lacking portions 1612 are provided, the suction surface 18 can be attached to a rugged or rough surface by suction.

While the case where the suction cup main body 14 is composed of the curved surface portion 1402 and the columnar portion 1404 has been described in the above embodiments, the shape of the suction cup main body 14 is not limited to the shape in these embodiments, and various suction cup main body shapes in the past known are applicable.

In addition, though the piece body 1406 may be omitted, provision of the piece body 1406 permits easy removal of the suction cup 12, which is naturally advantageous.

Besides, the use of the suction cup 12 is not limited to the case of attaching an on-vehicle apparatus to a vehicle body. The suction cup 12 is applicable to various uses where conventional suction cups have been used, for example, in the cases where a television set, a picture or a mirror is attached to a wall having a rugged surface covered with a polyvinyl chloride-based wall paper, to a door having a rugged surface, or the like.

In addition, the mode of using the suction cup 12 may be arbitrary. For example, a mechanism for mechanically forcibly separating a central portion of the suction surface 18 from an objective surface of attachment may be provided on the back surface of the suction cup 12 (refer, for example, to U.S. Pat. No. 6,749,160 B1). In this case, for example, the suction cup main body 14 is formed in a circular disk shape, the gel layer 16 is also formed in a circular disk shape, and the suction surface 18 is formed as a flat surface.

What is claimed is:

1. A suction cup comprising:
    a suction cup main body formed from an elastic synthetic resin material, and
    a gel layer formed of a gel, said gel layer including a plurality of perforations disposed in a circular pattern in a surface of said gel layer, wherein
    said suction cup main body and said gel layer are integrally provided by two-color molding,
    said suction cup main body has an attachment surface, an outer perimeter of said attachment surface being continuous,
    said gel layer is molded on and covers said attachment surface, and
    a surface of said gel layer serves as a suction surface.

2. The suction cup as set forth in claim 1, wherein said gel is weatherproof.

3. The suction cup as set forth in claim 1, wherein said gel layer has a uniform thickness.

4. The suction cup as set forth in claim 1, wherein said attachment surface is formed in a concave shape.

5. The suction cup as set forth in claim 1, wherein said suction surface is formed in a concave shape.

6. The suction cup as set forth in claim 1, wherein said gel layer corresponds in size and shape to said attachment surface.

7. An on-vehicle apparatus to be mounted in a vehicle, said on-vehicle apparatus comprising:
    a suction cup for mounting said on-vehicle apparatus in said vehicle, wherein
    said suction cup has a suction cup main body formed from an elastic synthetic resin material, and a gel layer formed of a gel, said gel layer including a plurality of perforations disposed in a circular pattern in a surface of said gel layer,
    said suction cup main body and said gel layer are integrally provided by two-color molding,
    said suction cup main body has an attachment surface, an outer perimeter of said attachment surface being continuous,
    said gel layer is molded on and covers said attachment surface, and
    a surface of said gel layer is a suction surface.

8. The on-vehicle apparatus as set forth in claim 7, wherein a holder is projectingly provided on said on-vehicle apparatus, and said suction cup is provided on said holder.

* * * * *